US012770267B2

(12) United States Patent
Cha et al.

(10) Patent No.: US 12,770,267 B2
(45) Date of Patent: Oct. 20, 2026

(54) VEHICLE EQUIPPED WITH SENSOR FUSION TRACK DEVICE AND MERGING METHOD USING THE SAME

(71) Applicants: HYUNDAI MOTOR COMPANY, Seoul (KR); KIA CORPORATION, Seoul (KR)

(72) Inventors: Hyung Jin Cha, Seoul (KR); Su Min Jo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 462 days.

(21) Appl. No.: 18/502,312

(22) Filed: Nov. 6, 2023

(65) Prior Publication Data

US 2024/0202930 A1 Jun. 20, 2024

(30) Foreign Application Priority Data

Dec. 16, 2022 (KR) ........................ 10-2022-0177071

(51) Int. Cl.

| | |
|---|---|
| ***G06T 7/13*** | (2017.01) |
| ***G01S 17/89*** | (2020.01) |
| ***G01S 17/931*** | (2020.01) |
| ***G06T 7/521*** | (2017.01) |
| *B60W 40/02* | (2006.01) |
| *B60W 60/00* | (2020.01) |

(52) U.S. Cl.

CPC ................ *G06T 7/13* (2017.01); *G01S 17/89* (2013.01); *G01S 17/931* (2020.01); *G06T 7/521* (2017.01); *B60W 40/02* (2013.01); *B60W 60/0027* (2020.02); *G06T 2207/10028* (2013.01); *G06T 2207/20221* (2013.01); *G06T 2207/30261* (2013.01)

(58) Field of Classification Search

USPC .......................................................... 702/159

See application file for complete search history.

(56) References Cited

U.S. PATENT DOCUMENTS

| | | | | |
|---|---|---|---|---|
| 10,395,144 | B2 * | 8/2019 | Zeng | G06V 10/82 |
| 11,294,042 | B2 | 4/2022 | Sunil Kumar et al. | |
| 2007/0073473 | A1 * | 3/2007 | Altan | G01S 13/862 701/518 |

(Continued)

FOREIGN PATENT DOCUMENTS

| | | |
|---|---|---|
| JP | 2021-195018 A | 12/2021 |
| KR | 10-2017-0070391 A | 6/2017 |

(Continued)

*Primary Examiner* — Paul D Lee

(74) *Attorney, Agent, or Firm* — Morgan Lewis & Bockius LLP

(57) ABSTRACT

A vehicle according to an embodiment includes: a sensor including one or more sensors configured to obtain information about a target object present around the vehicle; and a sensor information fusion device including a processor configured to control to generate or maintain a sensor fusion track using the information about the target object provided by the sensing device, wherein the processor is configured to control to determine a length of the sensor fusion track using a partial LiDAR (PL) track in which only a portion of the target object is detected in a boundary area of the sensors and estimate an edge point in a shape reconstructed based on the determined length of the sensor fusion track.

18 Claims, 8 Drawing Sheets

(56) References Cited

U.S. PATENT DOCUMENTS

| | | | | |
|---|---|---|---|---|
| 2019/0120951 | A1 | 4/2019 | Fischer | |
| 2019/0375425 | A1* | 12/2019 | Harrison | B60W 50/045 |
| 2020/0118441 | A1* | 4/2020 | Han | G06N 20/00 |
| 2020/0156651 | A1* | 5/2020 | Golov | G01S 13/862 |
| 2020/0174112 | A1* | 6/2020 | Xing | G01S 7/41 |
| 2020/0191907 | A1* | 6/2020 | Jo | G01S 13/878 |
| 2022/0214444 | A1* | 7/2022 | Das | G01S 17/50 |

FOREIGN PATENT DOCUMENTS

| | | | |
|---|---|---|---|
| KR | 10-2020-0067506 | A | 6/2020 |
| KR | 10-2226372 | B1 | 3/2021 |
| KR | 10-2313944 | B1 | 10/2021 |
| KR | 10-2417613 | B1 | 7/2022 |

* cited by examiner

VEHICLE EQUIPPED WITH SENSOR FUSION TRACK DEVICE AND MERGING METHOD USING THE SAME

This application claims the benefit of Korean Patent Application No. 10-2022-0177071, filed on Dec. 16, 2022, which is hereby incorporated by reference as if fully set forth herein.

TECHNICAL FIELD

The present disclosure relates to a vehicle to which a sensor fusion track device is applied and an absorption and merging method using the same.

BACKGROUND

A current autonomous driving recognition system is being designed to maximize the strengths of sensors through a fusion of heterogeneous sensor information.

A light detection and ranging (LiDAR) sensor may have a desirable precision and may thus play an important role in estimating the positions and shapes of objects.

The current autonomous driving recognition system is being designed in many cases such that, when mass-producing a LIDAR sensor for autonomous driving level 3, the LiDAR sensor recognizes only a front area that has a major influence on control to have price competitiveness.

In the current autonomous driving recognition system, sensors configured to recognize the lateral sides of a host vehicle may include a front corner LiDAR (FCL) sensor and front/rear corner radio detection and ranging (radar) sensors.

In addition, a LiDAR output on a field of view (FOV) boundary may represent a partially detected object, and thus there may be a high probability that a track of a shape different from that of a real object is output. Thus, in a LIDAR FOV boundary area, the dependency on front/rear corner (or side) radars may be increased.

However, due to the characteristics of a radar sensor, estimation of a length of an object may be inaccurate, and thus such inaccuracy in length in a boundary area may lead to an erroneous determination of whether there is an intrusion on a host vehicle.

In addition, in a case of an occurrence of a split in the front/rear corner radars, a plurality of sensor fusion tracks may be output for a single target, which compromises the stability of the autonomous driving recognition system.

SUMMARY OF THE PRESENT DISCLOSURE

To solve the technical issues described above, an object of the present disclosure is to provide a vehicle to which a sensor fusion track device is applied and an absorption and merging method using the same, which may reconstruct a shape of a sensor fusion track using a partial LiDAR (PL) track output only for a partial shape of an object in a field of view (FOV) of a LiDAR and may thus improve length inaccuracy and split-induced instability in a lateral boundary that is potentially vulnerable despite high control association.

The technical issues to be solved by the present disclosure are not limited to what has been described above, and other technical issues not described herein may also be clearly understood by one of ordinary skill in the art to which the present disclosure pertains from the following description.

According to an aspect of the present disclosure, there is provided a vehicle comprising: a sensing device including one or more sensors comprising a LiDAR sensor and configured to obtain information about a target object present around the vehicle; and a sensor information fusion device including a processor configured to control to generate or maintain a sensor fusion track using the information about the target object provided by the sensing device, wherein the processor is further configured to: determine a length of the sensor fusion track using a partial LiDAR (PL) track in which a portion of the target object is detected in a boundary area of the LiDAR sensor; and estimate an edge point in a shape reconstructed based on the determined length of the sensor fusion track.

In addition, the sensors may include a light detection and ranging (LiDAR) sensor, and the processor may be configured to: select the sensor fusion track associated with the LiDAR sensor from among a plurality of sensor fusion tracks, and determine a boundary area of the selected sensor fusion track.

In addition, the processor may be configured to: verify validity of the PL track based on the boundary area of the sensor fusion track, and estimate the length of the sensor fusion track based on the verified PL track.

In addition, the processor may be configured to: differently set a merging priority for the sensor fusion track with the shape reconstructed using the PL track.

In addition, the processor may be configured to: determine the boundary area of the selected sensor fusion track, and for the determining, a longitudinal position of a sub-reference track associated with the boundary area of the sensor fusion track may be less than zero (0).

In addition, the processor may be configured to: verify the validity of the PL track, and for the verifying, verify the validity of the PL track when an age of a LiDAR track associated with the sensor fusion track is greater than a preset reference age.

In addition, the processor may be configured to: determine box points from respective corners of the LiDAR track; and determine a box point of a maximum longitudinal position value among the box points as a reference PL point.

In addition, the processor may be configured to estimate a length from the reference PL point to the longitudinal position of the sub-reference track as the length of the sensor fusion track.

In addition, the processor may be configured to: determine an edge point of the sensor fusion track based on the length of the sensor fusion track.

According to another aspect of the present disclosure, there is provided an absorption and merging method in a vehicle comprising a sensing device comprising one or more sensors comprising a LiDAR sensor and configured to obtain information about a target object present around the vehicle; and a sensor information fusion device including a processor configured to control to generate or maintain a sensor fusion track using the information about the target object provided by the sensing device, the method comprising, under the control of the processor, determining a length of the sensor fusion track using a PL track in which only a portion of the target object is detected in a boundary area of the LiDAR sensor; and estimating an edge point in a shape reconstructed based on the determined length of the sensor fusion track.

In addition, the method may comprise, under the control of the processor, selecting the sensor fusion track associated with the LiDAR sensor from among a plurality of sensor fusion tracks, and determining a boundary area of the selected sensor fusion track.

In addition, the method may comprise under the control of the processor, verifying validity of the PL track based on the boundary area of the sensor fusion track, and estimating the length of the sensor fusion track based on the verified PL track.

In addition, the absorption and merging method may comprise under the control of the processor, differently setting a merging priority for the sensor fusion track with the shape reconstructed using the PL track.

In addition, the absorption and merging method may comprise under the control of the processor, determining the boundary area of the selected sensor fusion track, wherein, for the determining, a longitudinal position of a sub-reference track associated with the boundary area of the sensor fusion track may be less than zero (0).

In addition, the absorption and merging method may comprise under the control of the processor, verifying the validity of the PL track when an age of a LiDAR track associated with the sensor fusion track is greater than a preset reference age.

In addition, the method may comprise under the control of the processor, determining box points from respective corners of the LiDAR track; and determining a box point of a maximum longitudinal position value among extracted the box points as a reference PL point.

In addition, the method may comprise under the control of the processor, estimating a length from the reference PL point to the longitudinal position of the sub-reference track as the length of the sensor fusion track.

In addition, the method may comprise under the control of the processor, determining an edge point of the sensor fusion track based on the length of the sensor fusion track.

The method described above may be materialized in the form of a program code or computer-readable instructions stored in a non-transitory computer-readable memory and performed in the vehicle by being executed by the processor.

According to various embodiments of the present disclosure described herein, a vehicle to which a sensor fusion track device is applied and an absorption and merging method using the same may reconstruct a shape of a sensor fusion track using a PL track output only for a partial shape of an object in an FOV of a LiDAR, and may thereby improve length inaccuracy and split-induced instability in a lateral boundary area that is potentially vulnerable despite high control association.

In addition, the vehicle to which the sensor fusion track device is applied and the absorption and merging method using the same may have the following three effects by determining a forward edge point of a sensor fusion track with a PL track that outputs only a part of an object in a LiDAR FOV boundary of a recognition system formed using a LiDAR track having a limited FOV for price competitiveness.

First, accurate forward edge point estimation may improve misrecognition and non-recognition that invades a host vehicle.

Second, it is possible to solve an issue that multiple tracks are generated for the same object due to a split of a front/rear side radar track.

Third, improved performance in the estimation of a most proximate collision position for a target object may improve the sensitivity of autonomous driving control and determination.

The effects to be obtained from the present disclosure are not limited to those described above, and other effects not described above will be apparent to one of ordinary skill in the art to which the present disclosure pertains from the following description.

DETAILED DESCRIPTION OF THE DISCLOSURE

Figure 1:
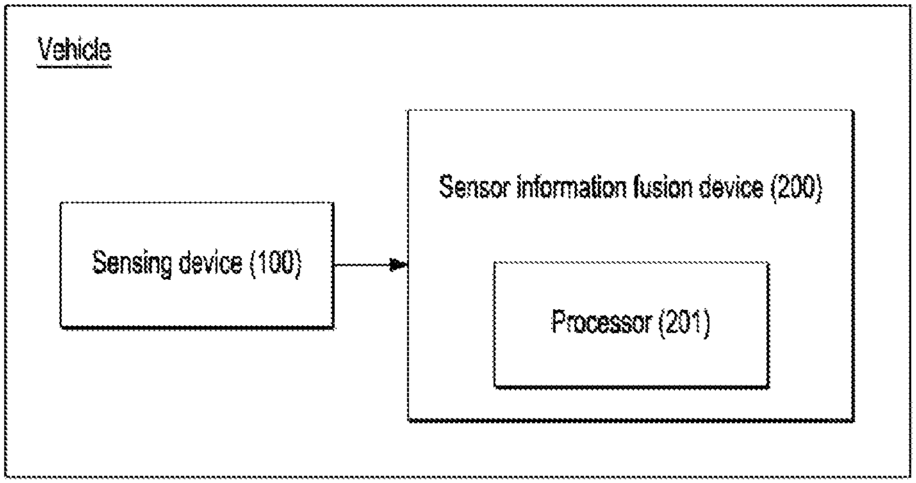
FIG. 1 is a block diagram illustrating a vehicle to which a sensor fusion track device is applied according to an embodiment.

Hereinafter, embodiments of the present disclosure will be described in detail with reference to the accompanying drawings, and the same or similar elements will be given the same reference numerals regardless of reference symbols, and redundant description thereof will be omitted.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation. For example, "OO module, unit, and/or -er/or" and "XX module, unit, and/or -er/or" may be components that perform different functions, but may not be physically separated but may perform the functions in parallel or in sequential order in the same microprocessor.

Further, in describing the embodiments of the present disclosure, when it is determined that a detailed description of related publicly known technology may obscure the gist of the embodiments described herein, the detailed description thereof will be omitted.

The accompanying drawings are used to illustrate various technical features, and it is to be understood that the embodiments described herein are not limited by the accompanying drawings. As such, the embodiments of the present disclosure should be construed as extending to any alterations, equivalents, and substitutes, in addition to those that are particularly set out in the accompanying drawings.

Although terms including ordinal numbers, such as "first, " "second," and the like, may be used herein to describe various elements, the elements are not limited by these terms. These terms are only used to distinguish one element from another.

In the description of the embodiments, when it is described as being formed "on/above" or "under/below" an element, it may be construed that two elements are in direct contact, or the two elements are in indirect contact with one or more other elements disposed therebetween.

For example, the expression "B is disposed, positioned, or located on A" may only indicate that B is shown on or above A in the accompanying drawings, unless otherwise defined or in a case where B needs to be disposed, positioned, or located above A due to the nature of A or B. In an actual product, B may be disposed, positioned, or located under/below A, or B and A may be disposed, positioned, or located side-by-side.

The term "and/or" is used to include any combination of multiple items that are subject to it. For example, "A and/or B" may include all three cases, for example, "A," "B," and "A and B."

When an element is described as being "coupled" or "connected" to another element, the element may be directly coupled or connected to the other element. However, it is to be understood that another element may be present therebetween. In contrast, when an element is described as being "directly coupled" or "directly connected" to another element, it should be understood that there are no other elements therebetween.

The singular forms "a," "an," and "the" are intended to include the plural forms as well, unless the context clearly indicates otherwise.

It will be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Hereinafter, the operating principles and embodiments of the present disclosure will be described with reference to the accompanying drawings.

FIG. 1 is a block diagram illustrating a vehicle to which a sensor fusion track device is applied according to an embodiment.

Referring to FIG. 1, a vehicle may include a sensing device 100 configured to detect an object present outside and a sensor fusion track device 200 configured to fuse sensor information obtained from the sensing device 100 and recognize the object. The sensor fusion track device 200 may be referred to as a sensor information fusion device.

The sensing device 100 may include one or more sensors configured to obtain sensor information about a target object present around the vehicle. The sensing device 100 may obtain at least one set of information, such as, for example, a position, a moving speed, a moving direction, and a type (e.g., vehicle, pedestrian, bicycle, motorcycle, etc.) of the target object, according to a type of sensor.

The sensing device 100 may include various sensors, as non-limiting examples, an ultrasonic sensor, a radio detection and ranging (radar) sensor, a camera, a laser scanner, a light detection and ranging (LiDAR) sensor, and a near vehicle detection (NVD) sensor. For example, the sensing device 100 may include SF (FC, FR, CR fusion track) sensor fusion, a front side LIDAR, NVD, rear side image recognition (RSIR), and the like. However, examples of which are not limited thereto.

The sensor fusion track device 200 may include a processor 201 configured to control to generate or maintain a sensor fusion track using the information about the target object provided by the sensing device 100. The processor 201 may control overall the sensor fusion track device 200. For example, the processor 201 may control to determine a length of the sensor fusion track using a partial LiDAR (PL) track in which only a portion of an object is detected in a boundary area of a LiDAR, and to estimate an edge point which is a most proximate collision position in a shape reconstructed based on the determined length of the sensor fusion track. This will be further described below. According to an exemplary embodiment of the present disclosure, the sensor fusion track device 200 may include the processor 201 (e.g., computer, microprocessor, CPU, ASIC, circuitry, logic circuits, etc.) and an associated non-transitory memory storing software instructions which, when executed by the processor 201, provides the functionalities of the sensor fusion track device 200. Herein, the memory and the processor 201 may be implemented as separate semiconductor circuits. Alternatively, the memory and the processor 201 may be implemented as a single integrated semiconductor circuit. The processor 201 may embody one or more processor (s).

Figure 2:
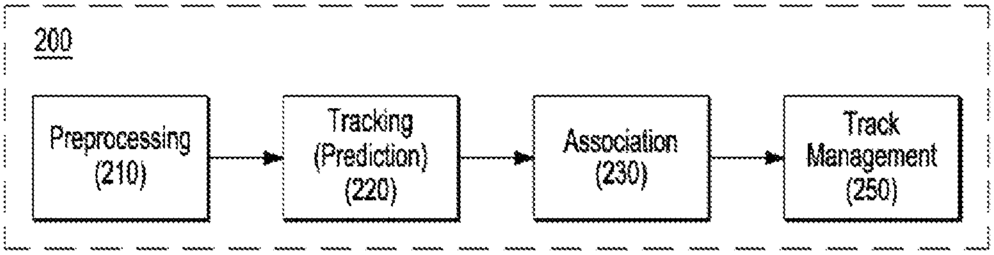
FIG. 2 is a schematic block diagram illustrating a configuration of a sensor fusion track device according to an embodiment.

FIG. 2 is a schematic block diagram illustrating a configuration of a sensor fusion track device according to an embodiment.

Referring to FIG. 2, the processor 201 may include a preprocessing unit 210, a predicted track generation unit 220, an association unit 230, and a fusion track management unit 240. The processor 201 may include a track merging logic.

The preprocessing unit 210, the predicted track generation unit 220, the association unit 230, and the fusion track management unit 240 may each operate under the control of the processor 201.

The preprocessing unit 210 may generate one or more tracks using sensor information output from one or more sensors and perform filtering on sensor tracks used for dynamic object fusion (DOF) through a validity check (e.g., field of view (FOV), confidence Lv, class, etc.) performed on the generated tracks. In this case, the sensor information output from the sensors may be provided in the form of a rectangle or box that basically includes a width and a length.

That is, the preprocessing unit 210 may perform a preprocessing process by which invalid sensor tracks are filtered out through the validity check performed on the sensor tracks.

The predicted track generation unit 220 may compensate for temporal positions of generated DOF tracks.

The association unit 230 may determine a uniformity or similarity between the tracks generated by the respective sensors and fuse them into a single sensor fusion track. For example, the association unit 230 may determine a reference track and a target track based on sensor combinations, determine the same object according to a strategy, fuse information of sensors from which the same object is determined, and estimate information of a DOF track.

For example, when the same object is determined as a result of the determination, the association unit 230 may reconstruct a shape of the sensor fusion track using a PL track. For example, the association unit 230 may select a sensor fusion track including a LiDAR sensor and determine a boundary area of the selected sensor fusion track.

The association unit 230 may verify validity of the PL track based on the determined boundary area of the sensor fusion track, and estimate a length of the sensor fusion track that uses information of the PL track. This will be further described below.

The fusion track management unit 240 may assign an identifier (ID) to the generated or corrected sensor fusion track and process the sensor fusion track. For example, the fusion track management unit 240 may manage a status of generated DOF tracks, and merge and delete tracks according to various strategies. The status of a DOF track may include a newly generated DOF track status (new), an updated DOF track status (update), a coasted DOF track status (coasting), and the like.

In addition, under the control of the processor 201, the fusion track management unit 240 may determine a confidence of two tracks having a certain or greater size of an overlapping area therebetween and may delete one of them.

In addition, under the control of the processor 201, the fusion track management unit 240 may vary a merging priority of sensor fusion tracks of which shapes are reconstructed using the PL track.

That is, under the control of the processor 201, the fusion track management unit 240 may assign a priority or priority right to a sensor fusion track for merging the sensor fusion tracks.

For example, increasing the merging priority of sensor fusion tracks may be described based on a rear area and a front area.

In a case of the rear area, a current highway driving pilot (HDP) may not change a lane, and thus a track disposed in a lateral boundary area may be most important in terms of an influence on control.

In a case of the front area, first, an edge point of a shape-reconstructed track may use a LiDAR track, and a relatively high confidence may thus be evaluated. Second, merging the shape-reconstructed track and a sensor fusion track in which a shape is not reconstructed but a LiDAR is combined may rarely occur according to a DOF strategy. Third, when the shape is not reconstructed, a longitudinal position of the LiDAR may be used in a sensor fusion track of a side (or lateral) area, and thus there be no overlapping. Last, a lateral boundary area may be close to a collision point and may thus be important.

Figure 3:
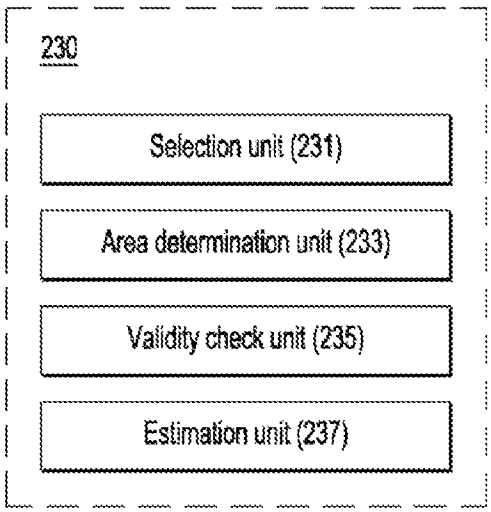
FIG. 3 is a schematic block diagram illustrating a configuration of an association unit according to an embodiment.
Figure 4:
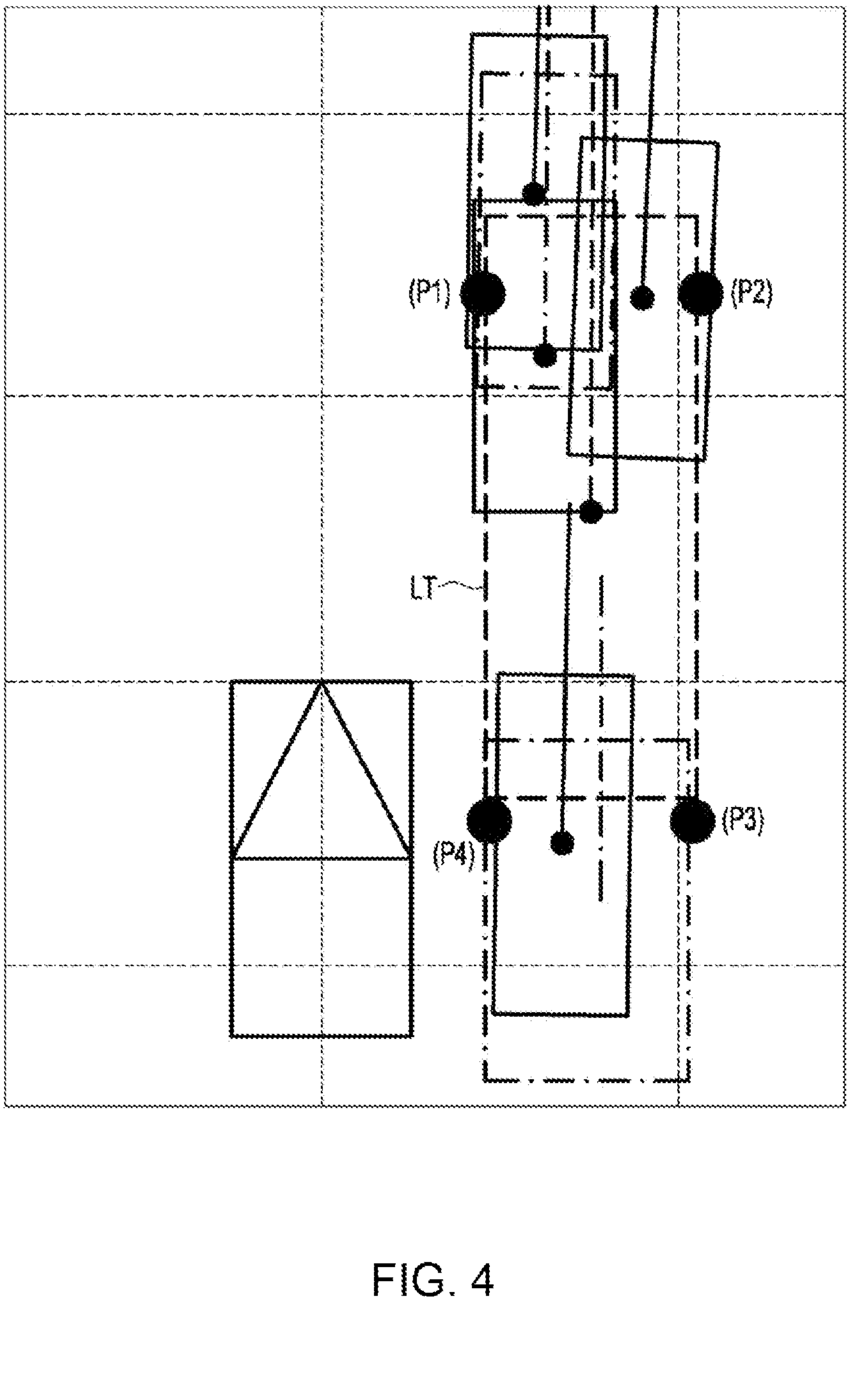
FIG. 4 shows a real sensor output that selects a reference partial LiDAR (PL) point.
Figure 5:
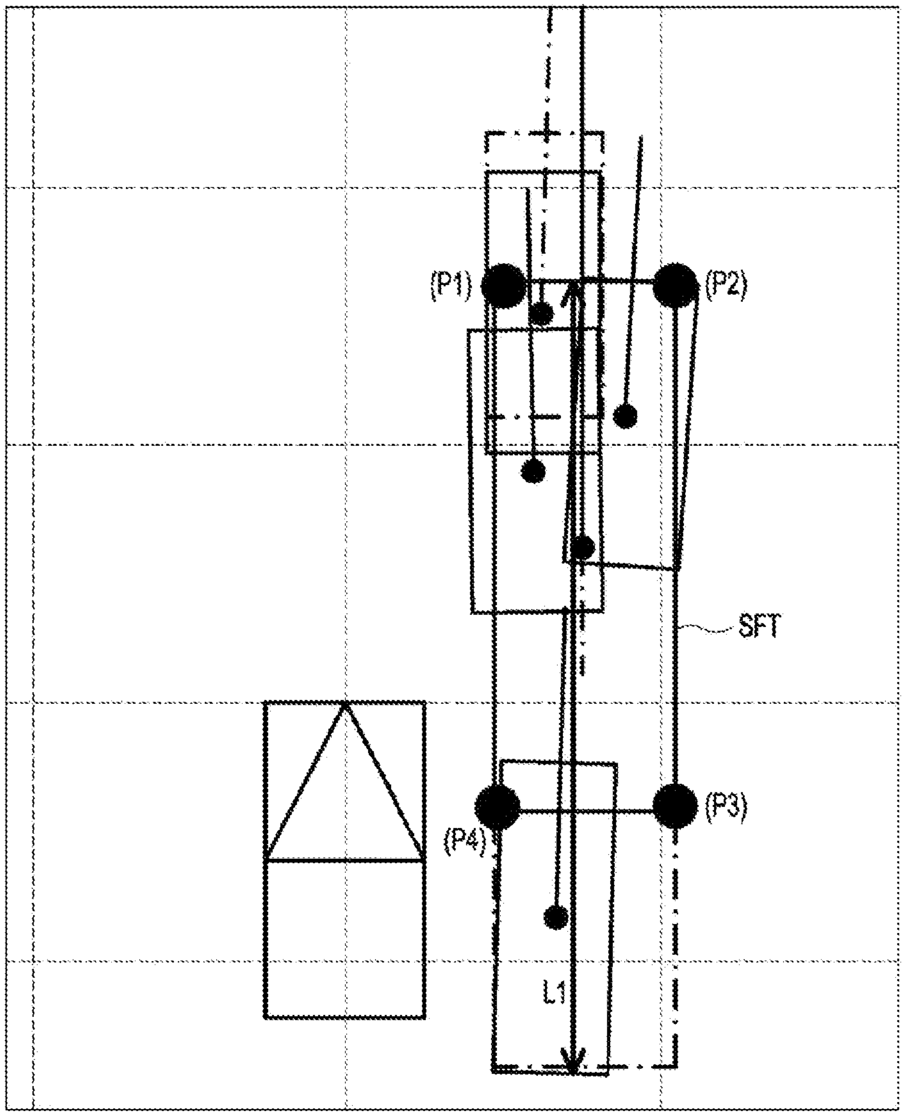
FIG. 5 shows a real sensor output that estimates a length of a sensor fusion track.

FIG. 3 is a schematic block diagram illustrating a configuration of an association unit according to an embodiment. FIG. 4 shows a real sensor output that selects a reference PL point. FIG. 5 shows a real sensor output that estimates a length of a sensor fusion track.

Referring to FIG. 3, under the control of a processor, the association unit 230 may reconstruct a shape of a sensor fusion track using a PL track when the same object is determined. The association unit 230 may include a selection unit 231, an area determination unit 233, a validity check unit 235, and an estimation unit 237.

The selection unit 231 may select a sensor fusion track including a LiDAR sensor. That is, under the control of the processor, the selection unit 231 may check whether the LIDAR sensor is included in a combination of sensor fusion tracks, and may not select a sensor fusion track that does not include the LiDAR sensor but select a sensor fusion track that includes the LiDAR sensor.

The area determination unit 233 may determine a boundary area of the selected sensor fusion track, under the control of the processor. In this case, a longitudinal position of a sub-reference track associated with the boundary area of the sensor fusion track may be less than zero (0). The sub-reference track may refer to a track that is determined to have the highest confidence of a longitudinal position of a boundary area from a current sensor combination including the corresponding sensor fusion track.

For example, a front side LiDAR may only view a front side of a host vehicle but not view a rear side thereof, and thus when the sub-reference track with the highest confidence is in a rear area, a more accurate length of the sensor fusion track may be determined. In this case, to verify whether the sub-reference track is in the rear area, the area determination unit 233 may check whether the longitudinal position is less than 0, under the control of the processor.

The validity check unit 235 may verify validity of a PL track under the control of the processor. For example, it may verify the validity of the PL track when an age of the LiDAR track associated with the sensor fusion track is higher than a preset reference age. In this example, the reference age may be 5.

The age of the LiDAR track may refer to a total time after the LiDAR track is generated. Thus, the age of the LiDAR track may increase as the age of the LiDAR track is updated. That is, the LiDAR track with a greater age may be basically a track with a greater confidence. Thus, that the age of the LIDAR track is high may indicate that tracking of the LiDAR track continues steadily.

As described above, when all the conditions for the association unit 230, the selection unit 231, the area determination unit 233, and the validity check unit 235 are satisfied, a shape of a sensor fusion track may be reconstructed through the estimation unit 237.

That is, when all the conditions for the selection unit 231, the area determination unit 233, and the validity check unit 235 are satisfied, the estimation unit 237 may estimate a length of the sensor fusion track using information of a PL track, under the control of the processor.

The estimation unit 237 may select a reference PL point for the shape reconstruction, under the control of the processor.

As shown in FIG. 4, the estimation unit 237 may determine a maximum value of a longitudinal position among four box points P1 to P4 of a LiDAR track (or shortly "LT), and select it as a reference PL point, under the control of the processor.

When the reference PL point is selected, the estimation unit 237 may reprocess the length of the sensor fusion track, under the control of the processor. As shown in FIG. 5, when selecting a longitudinal position of a sub-reference track, the estimation unit 237 may estimate a length L1 of a sensor fusion track (or shortly "SFT" as indicated) up to the reference PL point and may thereby improve the reliability of an edge point of the sensor fusion track.

In this case, the PL track is a track obtained by detecting a portion of an object, and thus physical values such as a position, a width, and a length may not be matched to the actual ones of the object. However, even though the PL track is obtained by detecting only a portion of the object due to the characteristics of a LiDAR sensor, the portion may have a relatively high accuracy of the shape. For example, a portion at which the object ends, such as, for example, a position of a front bumper of a target vehicle, may be reliable.

Based on these characteristics, the estimation unit 237 may estimate the length of the sensor fusion track using the PL track, under the control of the processor, thereby improving the accuracy of an edge point.

The edge point of the sensor fusion track described above may be determined by a longitudinal position, a horizontal position, a length, a width, and a heading angle, and thus estimating the length of the sensor fusion track using the PL track may improve the accuracy.

A process in which the estimation unit 237 selects a reference PL point and estimates a length of a sensor fusion track, as described above, is shown in FIG. 6.

Figure 6:
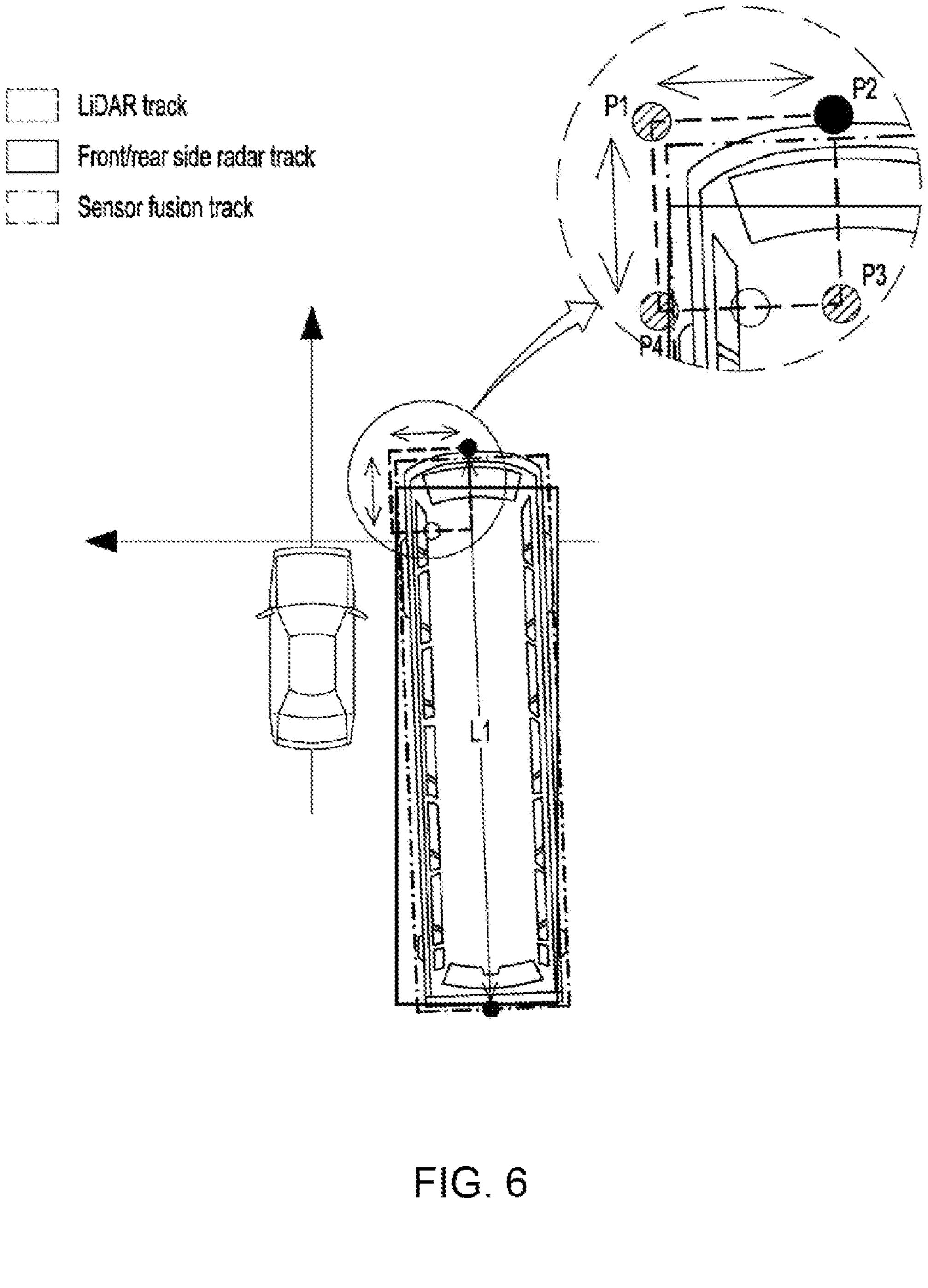
FIG. 6 shows an example visualization of real sensor outputs shown in FIGS. 4 and 5.

FIG. 6 shows an example visualization of real sensor outputs shown in FIGS. 4 and 5.

Referring to FIG. 6, a LiDAR track is indicated by a green line (bold line), a front/rear radar track is indicated by a purple line (thin line), and a sensor fusion track is indicated by a red line (broken line).

As shown in FIG. 6, the estimation unit 237 may select, as s reference PL point, a point of a maximum longitudinal position among four vertices (or box points) of a PL track, under the control of the processor.

In addition, under the control of the processor, the estimation unit 237 may apply an end point of a rear bumper of a sub-reference track and an end point of a front bumper of the PL track to reconstruct a shape to estimate a length of the sensor fusion track as described below. In this case, the end point of the front bumper of the PL track may be the reference PL point.

The length of the sensor fusion track may be a length that connects the longitudinal position of the reference PL point to a longitudinal position of the sub-reference track.

Figure 7:
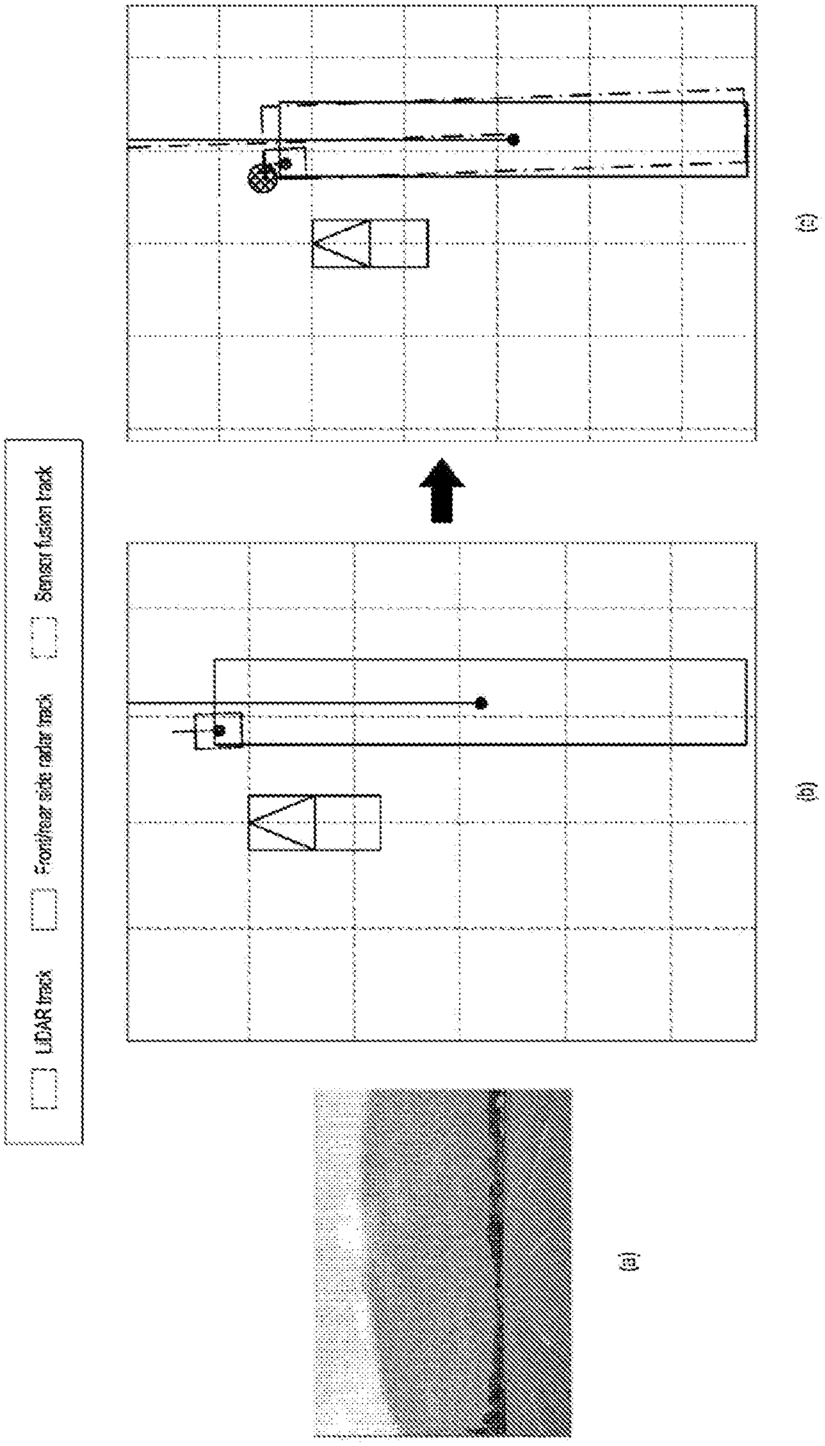
FIGS. 7 and 8 show examples of a real state measured while a vehicle including a sensor fusion device is traveling on a real road according to an embodiment.
Figure 8:
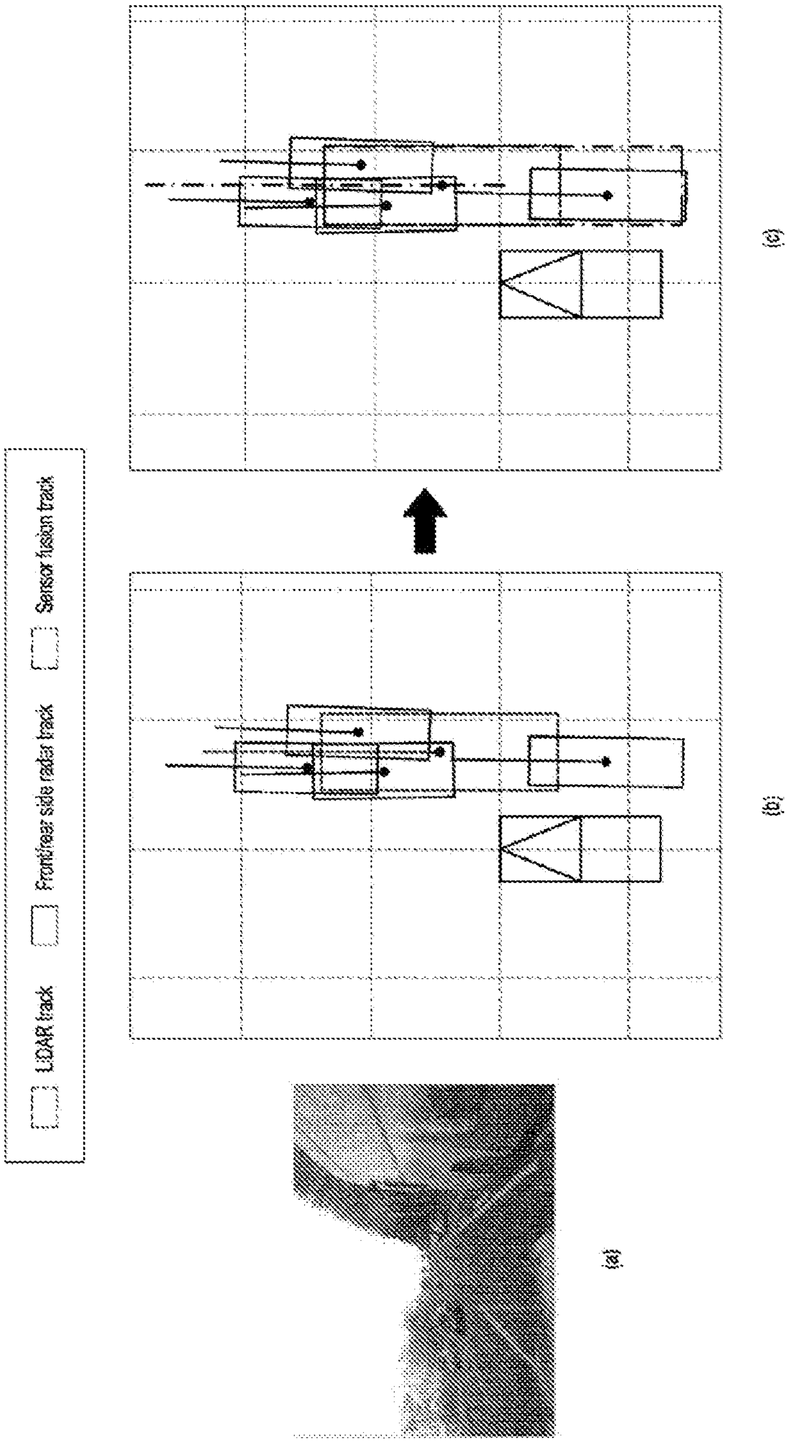

FIGS. 7 and 8 show examples of a real state measured while a vehicle including a sensor fusion device is traveling on a real road according to an embodiment.

In FIGS. 7 and 8, a LiDAR track is indicated by a green line, a front/rear side radar track is indicated by a gray line, and a sensor fusion track is indicated by a purple line.

Referring to FIG. 7, a large bus is traveling on the side of a host vehicle while the host vehicle is traveling on a real road. (a) of FIG. 7 shows a webcam screen, (b) of FIG. 7 shows a sensor output according to the related art, and (c) of FIG. 7 shows a sensor r fusion track to which the present disclosure is applied.

As shown in (b) of FIG. 7, a PL track detects only a portion of the large bus, and track information may thus be inaccurate. In addition, it is verified that a front edge point (green point) of the front/rear side radar track is a longitudinal position and has an error of approximately 0.8 m.

As shown in (c) of FIG. 7, using information of the PL track, it is possible to accurately determine a front edge point (red point) of the sensor fusion track, as described above with reference to FIGS. 1 through 6.

Referring to FIG. 8, a large bus is traveling at a low speed on the side of a host vehicle while the host vehicle is traveling on a real road. (a) of FIG. 8 shows a webcam screen, (b) of FIG. 8 shows a sensor output according to the related art, and (c) of FIG. 8 shows a sensor fusion track to which the present disclosure is applied.

As shown in (b) of FIG. 8, only a portion of an object is detected in a LiDAR boundary area, and information of a PL track may thus be inaccurate. In addition, the front/rear side radar track is split, and track information may thus be inaccurate. Since the PL track and the front/rear side radar track are inaccurate, misrecognition may occur in the application of the related art.

Unlike this, according to the present disclosure, as shown in (c) of FIG. 8, reconstructing a shape for a PL track in which a shape is inaccurate in a rear area as only a portion is detected and for a front/rear side radar track that is split into and output as inaccurate tracks may improve an edge point and apply a merging priority to effectively remove the split front/rear side radar tracks.

The present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, and the like.

Therefore, the foregoing detailed description should not be construed as restrictive but be considered illustrative in all respects. The scope of the present disclosure should be determined by a reasonable interpretation of the appended claims, and all modifications within the equivalent scope of the present disclosure are considered included in the scope of the present disclosure.

What is claimed is:

1. A vehicle, comprising:
- a sensor comprising one or more sensors configured to obtain information about a target object present around the vehicle, the one or more sensors comprising a light detection and ranging (LiDAR) sensor, wherein the target object is laterally spaced apart from the vehicle with a partial portion of the target object disposed within a detection area of the LiDAR sensor; and
- a sensor information fusion device comprising a processor configured to control to generate or maintain a sensor fusion track using the information about the target object provided by the sensor, wherein the processor is further configured to:
- determine a length of the sensor fusion track using a partial LiDAR (PL) track associated with the partial portion of the target object which is detected by the LiDAR sensor;
- estimate an edge point in a shape reconstructed based on the length of the sensor fusion track; and
- control driving of the vehicle based on the edge point.

2. The vehicle of claim 1, wherein the processor is further configured to select the sensor fusion track associated with the LiDAR sensor from among a plurality of sensor fusion tracks, and determine a boundary area of the selected sensor fusion track.

3. The vehicle of claim 2, wherein the processor is further configured to verify validity of the PL track based on the boundary area of the sensor fusion track, and estimate the length of the sensor fusion track based on the verified PL track.

4. The vehicle of claim 3, wherein the processor is further configured to differently set a merging priority for the sensor fusion track with the shape reconstructed using the PL track.

5. The vehicle of claim 3, wherein the processor is further configured to determine the boundary area of the selected sensor fusion track, and wherein, for the determining, a longitudinal position of a sub-reference track associated with the boundary area of the sensor fusion track is less than zero (0).

6. The vehicle of claim 3, wherein the processor is further configured to verify the validity of the PL track when an age of a LIDAR track associated with the sensor fusion track is greater than a preset reference age.

7. The vehicle of claim 6, wherein the processor is further configured to:

determine box points from respective corners of the LiDAR track; and determine a box point of a maximum longitudinal position value among the box points as a reference PL point.

8. The vehicle of claim 7, wherein the processor is further configured to estimate a length from the reference PL point to a longitudinal position of a sub-reference track as the length of the sensor fusion track.

9. The vehicle of claim 7, wherein the processor is further configured to determine an edge point of the sensor fusion track based on the length of the sensor fusion track.

10. A method for controlling a vehicle comprising a sensor comprising one or more sensors comprising a light detection and ranging (LIDAR) sensor and configured to obtain information about a target object present around the vehicle, and a sensor information fusion device comprising a processor configured to control to generate or maintain a sensor fusion track using the information about the target object provided by the sensing device, the method comprising:

detecting, by the one or more sensors, the target object which is laterally spaced apart from the vehicle and a partial portion of which is disposed within a detection area of the LiDAR sensor;

determining, by the processor, a length of the sensor fusion track using a partial LiDAR (PL) track associated with the partial portion of the target object which is detected by the LiDAR sensor;

estimating, by the processor, an edge point in a shape reconstructed based on the length of the sensor fusion track; and controlling driving of the vehicle based on the edge point.

11. The method of claim 10, further comprising:

selecting, by the processor, the sensor fusion track associated with the LiDAR sensor from among a plurality of sensor fusion tracks, and determining a boundary area of the selected sensor fusion track.

12. The method of claim 11, further comprising:

verifying, by the processor, validity of the PL track based on the boundary area of the sensor fusion track, and estimating the length of the sensor fusion track based on the verified PL track.

13. The method of claim 12, further comprising:

differently, by the processor, setting a merging priority for the sensor fusion track with the shape reconstructed using the PL track.

14. The method of claim 12, further comprising:

determining, by the processor, the boundary area of the selected sensor fusion track, wherein, for the determining, a longitudinal position of a sub-reference track associated with the boundary area of the sensor fusion track is less than zero (0).

15. The method of claim 12, further comprising:

verifying, by the processor, the validity of the PL track when an age of a LIDAR track associated with the sensor fusion track is greater than a preset reference age.

16. The method of claim 15, further comprising:

determining, by the processor, box points from respective corners of the LiDAR track; and determining a box point of a maximum longitudinal position value among the box points as a reference PL point.

17. The method of claim 16, further comprising:

estimating, by the processor, a length from the reference PL point to a longitudinal position of a sub-reference track as the length of the sensor fusion track.

18. The method of claim 16, further comprising:

determining, by the processor, an edge point of the sensor fusion track based on the length of the sensor fusion track.

* * * * *